(12) United States Patent
Trecker et al.

(10) Patent No.: US 8,017,169 B2
(45) Date of Patent: Sep. 13, 2011

(54) METHOD OF MANUFACTURE FOR SHELF STABLE PASTEURIZED CHEESE SHREDS

(75) Inventors: Gary William Trecker, McHenry, IL (US); Stephen S. Williams, Cordova, TN (US)

(73) Assignee: Kraft Foods Global Brands LLC, Northfield, IL (US)

( * ) Notice: Subject to any disclaimer, the term of this patent is extended or adjusted under 35 U.S.C. 154(b) by 831 days.

(21) Appl. No.: 11/323,098

(22) Filed: Dec. 30, 2005

(65) Prior Publication Data

US 2007/0154612 A1 Jul. 5, 2007

(51) Int. Cl.
*A23C 19/00* (2006.01)
(52) U.S. Cl. .......... 426/582; 426/36; 426/417; 426/573
(58) Field of Classification Search .................... 426/582
See application file for complete search history.

(56) References Cited

U.S. PATENT DOCUMENTS

| | | | |
|---|---|---|---|
| 3,636,733 A | | 1/1972 | Kichline et al. |
| 4,960,605 A | * | 10/1990 | Trecker et al. ............... 426/582 |
| 5,104,675 A | * | 4/1992 | Callahan et al. ............. 426/582 |
| 5,626,893 A | | 5/1997 | Reddy |
| 5,871,797 A | | 2/1999 | Henson |
| 5,935,634 A | | 8/1999 | Gamay et al. |
| 6,319,526 B1 | * | 11/2001 | Dahlstrom et al. ............ 426/36 |
| 6,326,038 B1 | * | 12/2001 | Brafford et al. ............... 426/74 |
| 6,372,268 B1 | * | 4/2002 | Silver et al. .................... 426/36 |
| 6,426,102 B1 | | 7/2002 | Isom et al. |

OTHER PUBLICATIONS

EPA (http://www.epa.gov/ttn/chief/ap42/ch09/final/c9s06-1.pdf; Food and Agriculture Industry; 2001).*
Journal of Dairy Science vol. 83 No. 11 2393-2409 © 2000 by American Dairy Science Association®.*
Fundamentals of Cheese Science By: Fox, Patrick F.; Guinee, Timothy O,; Cogan, Timothy M.; McSweeney, Paul L. H. © 2000 Springer-Verlag.*
Mistry: International Dairy Journal 11 (2001) 413-422; Low fat cheese technology; Minnesota-South Dakota Dairy Foods Research Center, Dairy Science Department, South Dakota State University.*
Tanaka, N., Traisman, E., Plantinga, P., Finn, L., Flom, W., Meske, L., and Guggisberg, J., "Evaluation of Factors Involved in Antibotulinal Properties of Pasteurized Process Cheese Spreads," Journal of Food Protection, vol. 49, Jul. 1986, pp. 526-531.
Ter Steeg, P., Cuppers, H., Hellemons, J., and Rijke, G., "Growth of Proteolytic *Clostridium* botulinum in Process Cheese Products: I. Data Acquisition for Modeling the Influence of pH, Sodium Chloride, Emulsifying Salts, Fat Dry Basis, and Temperature," Journal of Food Protection, vol. 58, Oct. 1995, pp. 1091-1099.

* cited by examiner

*Primary Examiner* — Humera Sheikh
*Assistant Examiner* — Patricia A George
(74) *Attorney, Agent, or Firm* — Fitch, Even, Tabin & Flannery

(57) ABSTRACT

Shelf stable cheeses, especially shredded cheeses, and the manufacture thereof. Cheeses of the invention have good melting properties, are microbiologically safe and resistant to the growth of mold and pathogens when stored at room temperature, and can maintain physical integrity when subjected to temperature abuse. The cheese may be comprised of a mixture of salts (e.g., sodium chloride, disodium phosphate, sodium hexametophosphate, sodium alginate, titanium dioxide, sorbic acid, and the like), starch (e.g., waxy maize and the like), water, cheese, and cheese for manufacture.

34 Claims, No Drawings

METHOD OF MANUFACTURE FOR SHELF STABLE PASTEURIZED CHEESE SHREDS

FIELD OF THE INVENTION

This invention relates to shelf-stable cheeses which do not require refrigeration and methods of preparing such shelf-stable cheeses, especially shelf-stable shredded cheeses. The cheeses of this invention are shelf-stable at room temperatures, maintain physical integrity under high temperature abuse, have good organoleptic properties (e.g., are not brittle or dry), and exhibit good melting properties.

BACKGROUND OF THE INVENTION

Shredded cheese is a growing component of the overall cheese market largely because such a product offers added consumer convenience in the preparation of a wide variety of products without the necessity of manually shredding a block of cheese with a cheese grater or similar device. Cheese shreds may be used to provide a melted cheese topping on a food item that is more uniformly distributed than would be possible using larger blocks or slices of the same cheese. Shredded cheeses, for example, can be used as toppings or ingredients in homemade dishes such as pizzas, nachos, casseroles, salads, and the like, as well as in restaurant food items or retail snack and meal products. Shelf stable meal kits, including pizza kits, taco kits, pasta meal kits, and salad kits, represent an especially promising market for the present invention.

Since cheese shreds may be incorporated into a number of foods and snacks, they are often fortified with nutritional supplements. Nutritional fortification of cheese products may include supplementation with compounds or additives that benefit the overall state of health of the human body. Examples of nutritional fortification include supplementation by vitamins, minerals, and comparable ingredients. Thus, vitamins and minerals that are important to human metabolism, or that are ordinarily not available in sufficient amounts in the normal diet, may be added to the cheese shreds.

Ideally, cheese shreds should not agglomerate during storage and use, and should provide melting characteristics and organoleptic properties similar to their counterpart non-shredded cheeses. Agglomeration can be a problem in both refrigerated and unrefrigerated cheese shreds. Unfortunately, to provide a non-agglomerating shredded cheese it is usually necessary to incorporate significant amounts of anti-caking agent in the shredded cheese. One such anti-caking agent is described by Reddy in U.S. Pat. No. 5,626,893. Anti-caking agents generally have adverse effects on melting and other organoleptic properties. For example, excess anti-caking agents tend to restrict melt characteristics or cause excessive browning when melted, both of which are perceived negatively by the consumer. Additionally, many anti-caking agents also impart an undesirable gritty texture to the shredded cheese product. Often the anti-caking agents also appear as white flecks or particulates on the cheese surfaces, which may be mistaken as mold growth by the consumer. Anti-caking agents also are often relatively expensive and tend to deteriorate functionality, such as storage properties, for instance by fostering unwanted microbial growth.

Agglomeration is also a problem when cheese shreds are subjected to temperature abuse. When subjected to temperatures of about 80 to about 100° F. during transportation or storage, cheese shreds will often lose physical integrity and clump together. Prior to the present invention, it was thought impossible to create a shredded cheese that would maintain physical integrity under abusive temperatures such as about 80 to about 100° F.

Cheese shreds also are often prone to "oiling off" when not stored at refrigerated temperature. Oiling off refers to the separation of oil from other components of cheese, resulting in the cheese product exuding oil when heated. Conventional cheese shreds can exhibit significant oiling off when stored at room temperature or elevated temperatures, and further oil separation upon heating is often exhibited.

Conventional cheese products generally have water activities of about 0.92 to about 1 and must, therefore, be stored at refrigerated temperatures to avoid spoilage by microbial growth. Water activity is a measure of the free water in a system. Foods with greater water activity tend to enable more microbial growth. Therefore, attempts to produce shelf-stable cheeses that can be stored at room temperature have generally involved the reduction of water activity and/or overall moisture in the cheese composition. Such efforts generally result in a brittle and dry cheese. These properties are considered to be defects in many cheeses, and are especially noticeable when the cheese is used to prepare shredded cheese because of the increased surface area of cheese shreds. Another manner of extending the shelf life of cheeses has been to use special packaging and/or refrigeration during shipping and marketing, as well as during storage by the consumer. However, specialized packaging tends to be quite expensive. Moreover, temperature abuse may lead to spoilage or loss of organoleptic acceptability even with special packaging.

The need to refrigerate cheese during shipping adds to the expense of distribution, and can limit distribution in remote and/or undeveloped areas, areas where refrigerated transportation and/or storage is not available and/or practical, and areas of intense heat. Malfunctioning of refrigeration equipment may also lead to the loss of entire shipments of cheese due to loss of organoleptic integrity, loss of texture properties, or spoilage due to microbiological growth such as mold or bacteria. In addition, the need to store shredded cheeses under refrigerated conditions greatly reduces the convenience of such products to the ordinary consumer. Therefore, a shelf stable shredded cheese or shredded cheese product that would not require refrigeration would reduce distribution expenses and increase the markets in which cheese and cheese products may be sold.

Although some attempts have been made to create shelf stable cheeses prior to the present invention, none have been able to provide organoleptically acceptable cheese shreds that maintain physical integrity and resist undesirable microbial growth under room temperature conditions. For instance, Gamay et al., U.S. Pat. No. 5,935,634 describes a low water activity cheese product that is shelf stable. Isom et al., U.S. Pat. No. 6,426,102, describes a method for coating shredded cheese with a supplement comprising calcium sulfate dihydrate rather than an anti-caking agent to prevent agglomeration. Neither Gamay nor Isom discloses a shredded cheese product that may be stored at room temperature or elevated temperatures while resisting agglomeration and maintaining good melt characteristics.

It would be desirable and advantageous, therefore, to provide shelf-stable cheeses, especially shredded cheeses, as well as a method for manufacturing such cheeses, that exhibit long shelf life and satisfactory organoleptic properties when stored at room temperatures. It is also desirable and advantageous to provide such shelf stable cheeses, especially shredded cheeses, and methods of manufacturing such cheeses, that are capable of withstanding temperature abuse, and that exhibit good melting properties. It is also desirable and advantageous to provide a cheese, and a method of manufacture for such cheese, that exhibits extended shelf life and satisfactory organoleptic properties when shredded and stored at room temperature, and that avoids agglomeration under temperatures of about 60 to about 100° F. when in shredded form. The present invention provides such methods and products.

SUMMARY OF THE INVENTION

The present invention relates generally to the manufacture of shelf stable shredded cheese, especially cheese shreds, cheese cubes, or other smaller shapes of cheese products with high surface-to-volume ratios. For purposes of this invention, "cheese shreds" is intended to include shredded cheese, diced cheese, and other relatively small shapes of cheese, generally one half inch or less in its smallest diameter, preferably one quarter inch or less in its smallest diameter. Although the word "cheese" is used to describe the invention herein, it is understood that other sources of fats and proteins, including vegetable fats and proteins, may be used in place of cheese. More specifically, the invention relates to a method of manufacturing cheese shreds with good melting properties that are microbiologically safe and resistant to the growth of mold and pathogens when stored at room temperature conditions, and that maintain physical integrity when subjected to temperature abuse.

In one embodiment of the present invention, the cheese shreds may be comprised of a mixture of cheese; cheese for manufacture; salts (including, e.g., sodium chloride, disodium phosphate, sodium hexametophosphate, sodium alginate, titanium dioxide, and sorbic acid); a filler, such as starch (e.g., waxy maize starch, corn starch, rice starch, or potato starch), corn syrup solids, maltodextrin, or cellulose powder; and water. The mixture is heated, then cooled, shredded, and packaged using conventional means. The cheese shreds maintain physical integrity and resist clumping or agglomeration, even under conditions that would normally constitute temperature abuse (e.g., 80-100° F.). The cheese shreds also maintain acceptable organoleptic qualities, resist microbial growth, and retain acceptable melting properties after storage at refrigerated temperatures, room temperature, or even high or abusive temperatures.

DETAILED DESCRIPTION

The present invention provides shelf stable cheese, and methods of manufacturing such shelf stable cheese, especially cheese shreds, that resist microbiological growth and may be stored at or above room temperature while maintaining physical integrity, acceptable organoleptic properties, and good melting properties. The invention provides a shelf-stable product that is resistant to microbial growth and avoids agglomeration at temperatures up to at least about 100° F. by taking advantage of a synergistic effect between moisture, pH, fat content, and preservatives. It has been shown, for example, that a shredded cheese with a moisture content of less than about 50%, a fat content of less than about 22%, a pH of less than about 6, and a total salt level of about 3% to about 5% (including NaCl and any emulsifying salts used) will provide the desired synergistic effect and result in a shelf stable shredded cheese. Unless stated otherwise, all percentages are by weight. One of ordinary skill in the art would appreciate that a number of known additives, such as ingredients that modify color, opacity, flavor, and bacterial/mold growth may be added to this formulation without departing from the spirit of the present invention. The cheese formed according to the present invention may be shredded and packaged according to any number of methods known in the art.

More preferably, a shredded cheese that will retain acceptable meltability and resist agglomeration at room temperature or high temperatures (at least up to about 100° F.) may be made by combining a protein source, a fat source, preservatives, and water to produce a cheese with moisture content of about 45 to about 50%, a fat content of about 15 to about 22%, a protein content of about 19 to about 24%, a pH of about 5.4 to about 5.6, and total salt level of about 3% to about 5% (preferably about 4% to about 5%). Such a cheese product will have good texture and will avoid agglomeration at higher temperatures, even when in a form with a large surface area relative to its volume (e.g. shredded or diced). Known antimicrobial agents may be added to this formula in order to make the cheese more resistant to bacterial and mold growth.

In one embodiment, the present invention comprises combining a protein source and fat source (one ingredient may act as both a protein source and a fat source, such as cheese and/or cheese for manufacture), a filler (such as starch), an emulsifier, a stabilizer, and water. In a more particular embodiment, the invention comprises about 21 to about 23% protein, about 16 to about 18% fat, about 2.7 to about 2.9% emulsifiers, about 0.4 to about 0.8% stabilizers, about 46.5 to about 48.5% water, about 4.4 to about 4.8% total salt, and a pH of about 5.45 to about 5.55. Such a cheese has a firmness and texture that is well suited for shredding, and will not agglomerate when stored at room temperature or elevated temperatures. Furthermore, such a cheese will not experience fat separation, or "oil off," during storage at room temperature or elevated temperatures.

The protein/fat source implemented in this mixture may comprise a variety of different natural cheeses, including cheddar, colby, swiss, or low-moisture part-skim mozzarella, or any other cheese with a consistency suitable for shredding, as well as mixtures thereof. The present invention also contemplates using a combination or blend of such cheeses. Powdered cheeses or protein powders may also be used in place of the above cheeses. The protein/fat source may also comprise cheese for manufacture, such as reduced fat cheddar or skim milk curd, alone or in combination. As used herein, "cheese for manufacture" refers to cheese made from milk which may be used as a component for processed cheese products. One or more of the natural cheeses and/or cheeses for manufacture may optionally be of the reduced fat variety. In a more particular embodiment, the cheese is a mixture of natural cheese and cheese for manufacture. The protein source may optionally be a milk protein concentrate or a caseinate. The fat source may optionally be a vegetable protein source.

The protein content of the finished cheese should be balanced in order to maintain a pleasing texture, desired firmness for shredding, and resistance to agglomeration. For instance, when the moisture content of the cheese product is about 46%, it is desirable to maintain the total protein content at about 25% or less. Significantly higher levels of protein generally create a cheese that is stiff and less manageable at heating, resulting in a final cheese product with a mealy consistency. With higher levels of protein (near 25% protein at 46% moisture content), a filler should normally be used to balance nonfat solids and to regulate the texture of the finished product. Such filler may be a starch (such as waxy maize starch, corn starch, rice starch, or potato starch), corn syrup solids, maltodextrin, or cellulose powder. Generally, the amount of such filler is about 1 to about 5%. Fillers such as nonfat dry milk and/or dried whey solids may also be used, but generally should be minimized since the high lactose content of such fillers tends to undesirably soften the final product. The lactose content of the finished product should generally be held to a minimum (less than about 2%, preferably less than about 1%) to prevent softening/stickiness and to prevent browning (Mallard reaction) over time.

The pH level of the cheese according to the present invention should be maintained at a level that results in a texture that is satisfactory for shredding and maintains the desired functional properties when stored in shredded form at elevated temperatures. A pH level of about 5.4 to about 5.6 is preferred for use with the present invention. Cheese products with a low pH, for instance less than 5.4, tend to fracture easily upon attempted shredding, have a mealier texture, and are more prone to oil off when stored at room temperature or elevated temperatures. Cheese products with a pH significantly greater than 6.0 have a softer texture and a consistency that is more difficult to shred, and tend to agglomerate when stored at room temperature or elevated temperatures.

An emulsifier may be used in the present invention. A number of emulsifiers may be used, such as orthophosphates (including disodium phosphates, monosodium phosphates, and trisodium phosphates), sodium hexametaphosphates, sodium acid pyrophosphates, trisodium citrate, or other emulsifiers or combinations of emulsifiers that do not support microbial growth. It is also appreciated that one of ordinary skill in the art would be able to combine other known processes for the manufacture of cheese with the present disclosure without departing from the scope of the present invention. Generally, such emulsifiers are present at about 2 to about 3%.

As with many food products, it is desired to provide a product that is resistant to microbial growth. Many characteristics of the food product (such as moisture content, pH, salt level, fat content, processing conditions, and preservatives) affect microbial growth, and interactions between these various characteristics determine whether a food product is stable under given storage conditions. In order to predict whether a given food product formulation will be acceptable for storage at a given temperature, predictive modeling may be used to create food safety curves, such as those described by Tanaka et al. in "Evaluation of Factors Involved In Antibotulinal Properties of Pasteurized Process Cheese Spreads," *J. Food. Prot.*, 49:526-531 (July 1986). Many predictive models have been developed that are similar to those described by Tanaka. In order to create a predictive model, two characteristics are plotted against each other (e.g., pH on the vertical axis versus total salts on the horizontal axis). A number of formulations with varying levels of the two plotted characteristics are tested for the presence of a given microorganism known to grow in the food product (e.g., *Clostridium botulinum*), and the results are mapped on the plot of the two components as either positive (indicating growth) or negative (indicating no growth). A conservative mathematical line or curve (e.g. a quadratic equation) is then fitted to the data so that only negative growth results lie beyond the curve. In this way, it can be determined how to safely adjust the level of one characteristic to compensate for changes in the level of the other characteristic. A computer may be used to factor in multiple curves, each plotting two different components against each other, in order to take into account the overall inhibitory effect of a variety of components in the food. Predictive modeling has proven to be an especially useful tool in developing shelf stable food products, since it allows one to predict the safety of a given formulation, but is limited in that it does not predict the functional properties of the food product and cannot determine when a cheese product will retain satisfactory melt characteristics, resist oiling off and agglomeration, and/or provide other properties that may be desired.

In order to ensure shelf stability, it is desirable to add one or more preservatives in order to reduce microbial growth and extend the shelf life of the finished product. Emulsifiers (such as the above-mentioned phosphate-containing or citrate-containing emulsifiers) in conjunction with salts (such as sodium chloride) act as preservatives. Additional preservatives and/or mold inhibitors may be added, such as sorbic acid, potassium sorbate, lactate, nisin, and/or the like. Generally, such preservatives or mold inhibitors are present at about 0.17 to about 0.30%.

A number of other compounds may also be added to enhance the properties of the cheese according to the present invention, including coloring compounds or compounds that alter the opacity of the product, flavor additives, and the like. Generally, such ingredients are present at less than 2.5%.

When cheeses have significantly lower levels of moisture combined with higher levels of fat than described above, the finished product will tend to agglomerate and experience oil off when stored at temperatures of 80° F. and above. For instance, processed cheese shreds with 39% moisture and 31% fat were compared to the present invention, and found to have inferior storage and melting properties. At a storage temperature of 80° F., the non-inventive cheese tended to clump together and experienced oil off. Furthermore, when melted, it was found that such cheese shreds exuded excessive amounts of free fat. The present invention was also compared to a processed cheese food with 43.5% moisture and 24% fat. Even at these levels of moisture and fat, the resulting non-inventive cheese product was difficult to shred, and when stored at 80° F. the shreds agglomerated with slight "oil off." Only the inventive cheese was acceptable under these conditions.

Cheeses may be cooked and processed using any conventional equipment, including the use of a laydown cooker, kettle, or other device. Shredding and packaging may also be accomplished with conventional equipment.

The following examples are intended to illustrate the invention and not to limit it. Unless noted otherwise, all percentages are by weight.

Example 1

Shelf-stable cheese shreds were prepared using the following ingredients in the amounts specified:

| Ingredient | Amount (%) |
|---|---|
| Reduced Fat Sharp Cheddar | 24.0 |
| Reduced Fat Cheddar for Manufacture | 56.0 |
| Starch (Waxy Maize, modified) | 3.5 |
| Disodium Phosphate | 2.0 |
| Sodium Chloride | 0.8 |
| Sorbic Acid | 0.2 |
| Sodium Hexametaphosphate | 0.8 |
| Sodium Alginate | 0.6 |
| Titanium Dioxide | 0.1 |
| Color | 0.05 |
| Water | 11.9 |

The sodium chloride, disodium phosphate, sodium hexametaphosphate, sodium alginate, titanium dioxide, and sorbic acid were blended together, then added to one half of the cheese and the colorant in a steam heated apparatus (Damrow Forty Pound Laydown Cooker) to create a cheese mixture. A high temperature steam blast was utilized to bring the temperature of the heating apparatus to about 150° F., at which point the remainder of the cheese was slowly added to the mixture while maintaining a constant temperature. The temperature was then increased to 167° F., and a slurry mixture comprising the starch and water was added to the mixture while maintaining a constant temperature of 167° F. The cook temperature of 167° F. was maintained for 2 minutes, after which the mixture was packaged (while still hot) and refrigerated at a temperature of 45° F. for five days. After refrigeration, the cheese mixture was shredded (Urschell Shredder, Model CC-D), and packaged in 16 oz. plastic pouches gas flushed with inert gas (70 percent nitrogen and 30 percent carbon dioxide or 100% nitrogen).

When stored at room temperature (68-70° F.), the cheese shreds remained soft and exhibited no separation of oily components or sticking/agglomeration after two weeks. Samples stored at elevated temperatures of 80, 90, and 100° F. similarly exhibited no separation of oil, and showed little sticking or agglomeration at up to two weeks.

Samples of the cheese shreds were stored for two weeks at 80° F. and were tested for melting properties. Shreds placed on tortilla chips and heated in an oven for three minutes melted and stuck to the chip nicely, with no browning. Samples placed on tortilla chips and heated in a microwave for 30 seconds to two minutes melted and stuck to the chips nicely. Microbiological studies indicated that the shreds were shelf stable.

Cheese shreds stored for more than 6 months at about 72° F. were free from mold and maintained identity (did not agglomerate). When compared to fresh cheese shreds of the same formulation, texture and color were comparable, and flavor remained acceptable (although flavor was slightly stale as compared to fresh cheese shreds).

Comparative samples of similar cheeses with 39% moisture and 31% fat experienced slight oil off when stored at 80° F. for comparable times, and exuded excessive amounts of free fat when melted. Comparative samples with 43.5% moisture and 24% fat, on the other hand, were difficult to shred, and agglomerated and exhibited slight oiling off when stored at 80° F. for comparable times.

Example 2

Shelf-stable cheese shreds formulated using a blend of reduced-fat Cheddar cheese and aged full fat Cheddar cheese. A combination of milk protein concentrate (80% protein) and waxy maize corn starch is used to balance nonfat solids. The processing and shredding of the cheese is performed according to Example 1, with the ingredients below added in the amounts specified:

| Ingredient | Amount (%) |
|---|---|
| Aged Cheddar Cheese | 9.0 |
| Reduced Fat Cheddar for Manufacture | 60.0 |
| Milk Protein Concentrate | 3.0 |
| Starch (Waxy Maize, modified) | 3.0 |
| Disodium Phosphate | 2.0 |
| Sodium Chloride | 0.8 |
| Sorbic Acid | 0.2 |
| Sodium Hexametaphosphate | 0.8 |
| Sodium Alginate | 0.4 |
| Titanium Dioxide | 0.1 |
| Color | 0.06 |
| Water | 20.64 |

Example 3

A mixture of sodium caseinate, water, and palm oil, rather than cheese, provides the protein and fat source for a shelf-stable cheese-like product. The mixture is treated as cheese and processed as described in Example 1, adding the following ingredients in the amounts specified:

| Ingredient | Amount (%) |
|---|---|
| Sodium Caseinate | 22.5 |
| Nonfat Dry Milk | 2.55 |
| Palm Oil | 20.95 |
| Disodium Phosphate | 2.0 |
| Monosodium Phosphate | 0.25 |
| Sodium Acid Pyrophosphate | 0.5 |
| Sodium Alginate | 0.4 |
| Sodium Chloride | 2.10 |
| Sorbic Acid | 0.2 |
| Titanium Dioxide | 0.1 |
| Natural Flavor | 1.0 |
| Color | 0.05 |
| Lactic Acid | 0.6 |
| Water | 46.8 |

We claim the following:

1. A method of manufacturing a shelf stable shredded cheese product that resists agglomeration when stored above about 70° F. comprising:
    combining a fat source, a protein source, a filler, salts, and water to form a cheese composition that is about 45 to about 50 wt. % moisture, about 15 to about 22 wt. % fat, about 19 to about 24 wt. % protein, about 3 to about 5 wt. % total salt, and has a pH between about 5.4 and about 6.0, and forming the cheese composition into cheese shreds of a size and shape capable of maintaining physical integrity and resisting agglomeration when stored above about 70° F. and/or under temperature abuse of about 80-100° F. for at least about two weeks to form a shredded cheese product.

2. The method of claim 1 wherein the shelf stable shredded cheese product retains organoleptic and melting properties similar to those of fresh product for at least about six months when stored at room temperature.

3. The method of claim 2 wherein the fat source and protein source comprise natural cheese.

4. The method of claim 2 wherein the fat source and protein source comprise a mixture of natural cheese and cheese for manufacture.

5. The method of claim 3 wherein the natural cheese is regular or reduced fat sharp cheddar cheese, colby cheese, swiss cheese, or low-moisture part skim mozzarella cheese.

6. The method of claim 2 wherein the filler is selected from the group of waxy maize starch, corn starch, rice starch, potato starch, corn syrup solids, maltodextrin, and cellulose powder.

7. A method of manufacturing a shelf stable cheese product comprising:
    (a) developing a food safety predictive model through steps comprising:
        (i) selecting two varying characteristics selected from the group consisting of pH, moisture content, fat content, protein content, and total salt content;
        (ii) preparing a plurality of test cheeses, each of the plurality of cheeses having different amounts of the two varying characteristics and further having a pH between about 5.4 and about 6.0, a moisture content between about 45 to about 50 wt. %, a fat content between about 15 to about 22 wt. % fat, a protein content between about 19 to about 24 wt. % protein, and a total salt content between about 3 to about 5 wt. %;
(iii) storing the plurality of test cheeses at a preselected temperature for a preselected period of time;
(iv) testing the plurality of test cheeses for the presence of a preselected microorganism;
(v) plotting the two varying characteristics of the plurality of test cheeses against one another on a graph and mapping the plurality of cheeses on the graph as points according to the two varying characteristics; and
(vi) fitting a line on the graph so that all of the points mapped on the graph corresponding to cheeses in which the preselected microorganism is present lie on a first side of the line;
(b) selecting a level of one of the varying characteristics and using the food safety predictive model to determine a level of the other varying characteristic such that a point representing the selected level of the one varying characteristic and the determined level of the other varying characteristic lies on a second side of the line fitted to the graph;
(c) developing a formulation having the levels of the varying characteristics according to step (b) and the moisture, fat, protein, and total salt content of the test cheeses in step (a)(ii);
(d) creating a first mixture comprising protein and fat in amounts determined according to the formulation and heating the first mixture at a temperature of about 150 to about 200° F.;
(e) adding salts, emulsifiers, and stabilizers to the first mixture in amounts determined according to the formulation to form a second mixture while maintaining temperature at about 150 to about 200° F.;
(f) adding a slurry comprising water and one or more fillers to the second mixture in amounts determined according to the formulation to form a third mixture while maintaining temperature at about 150 to about 200° F.; and
(g) packaging and cooling the third mixture to form a solid, shelf stable cheese product, that maintains physical integrity, avoids oiling off and agglomeration at room temperature conditions and/or under temperature abuse of about 80-100° F.

8. The method of claim 7 further comprising a step of shredding the solid, shelf stable cheese product to form a shelf stable shredded cheese product.

9. The method of claim 7 wherein the salts are sodium chloride, disodium phosphate, sodium hexametaphosphate, sodium alginate, titanium dioxide, and/or sorbic acid.

10. The method of claim 7 wherein the filler is waxy maize starch, corn starch, rice starch, potato starch, corn syrup solids, maltodextrin, or cellulose powder.

11. The method of claim 8 wherein the protein and fat comprise cheese or one or more cheese products.

12. The method of claim 11 wherein the cheese or cheese product comprise regular or reduced fat sharp cheddar cheese, colby cheese, swiss cheese, or low-moisture part-skim mozzarella cheese.

13. A shelf stable shredded cheese product that maintains physical shred integrity and resists agglomeration for at least six months when stored at room temperature comprising:
about 19-24 wt % protein, about 46.5 to about 48.5 wt. % moisture, about 16 to about 18 wt. % fat, about 4.4 to about 4.8 wt. % total salt, has a pH of about 5.45 to about 5.55, and maintains physical integrity, avoids oiling off and agglomeration at room temperature conditions and/or under temperature abuse of about 80-100° F.

14. The product of claim 13 wherein the shelf stable shredded cheese product further comprises a mixture of natural cheese and cheese for manufacture.

15. The product of claim 13 wherein said salt comprises sodium chloride, disodium phosphate, sodium hexametaphosphate, sodium alginate, titanium dioxide, and/or sorbic acid.

16. The product of claim 14 wherein said natural cheese is cheddar, colby, swiss, and/or low-moisture part-skim mozzarella, and the cheese for manufacture is reduced-fat cheddar, and/or skim milk curd.

17. A shelf stable shredded cheese product that does not exude oil when stored at 90° F. or higher for at least about 24 hours comprising:
about 19-24 wt % protein, about 46.5 to about 48.5 wt. % moisture, about 16 to about 18 wt. % fat, about 4.4 to about 4.8 wt. % total salt, has a pH of about 5.4 to about 6.0, and maintains physical integrity, avoids oiling off and agglomeration at room temperature conditions and/or under temperature abuse of about 80-100° F.

18. The shelf stable shredded cheese product of claim 17 wherein the pH is between about 5.45 to about 5.55.

19. The product of claim 18 wherein the shelf stable shredded cheese product further comprises a mixture of natural cheese and cheese for manufacture.

20. The product of claim 19 wherein the natural cheese is cheddar, colby, swiss, or low-moisture part-skim mozzarella, and the cheese for manufacture is reduced-fat cheddar, or skim milk curd.

21. A method of manufacturing a shelf stable shredded cheese product that resists agglomeration and oiling off when stored above about 90° F. g419-1a comprising:
combining a fat source, a protein source, a filler, salts, and water to form a cheese composition that is about 45 to about 50 wt. % moisture, about 16 to about 18 wt. % fat, about 21 to about 23 wt. % protein, about 2-3% emulsifying salt, about 3 to about 5 wt. % total salt, and has a pH between about 5.45 and about 5.55, forming the cheese composition into cheese shreds of a size and shape capable of maintaining physical integrity avoids oiling off and resisting agglomeration when stored above about 90° F. for at least about two weeks to form a shredded cheese product, and/or under temperature abuse of about 80-100° F.

22. The method of claim 21 wherein the shelf stable shredded cheese product comprises at least one emulsifying salt selected from the group comprising disodium phosphates, monosodium phosphates, and trisodium phosphates, and wherein the shredded cheese product retains organoleptic and melting properties similar to those of fresh product for at least about six months when stored at room temperature.

23. The method of claim 22 wherein the fat source and protein source comprise natural cheese.

24. The method of claim 22 wherein the fat source and protein source comprise a mixture of natural cheese and cheese for manufacture.

25. A shelf stable shredded cheese product that maintains physical shred integrity and resists agglomeration for at least six months when stored at room temperature comprising:
about 19-24 wt % protein, about 46.5 to about 48.5 wt. % moisture, about 16 to about 18 wt. % fat, about 2-3% emulsifiers, about 4.4 to about 4.8 wt. % total salt, has a pH of about 5.45 to about 5.55, and maintains physical integrity, avoids oiling off and agglomeration at room temperature conditions and/or under temperature abuse of about 80-100° F.

26. The product of claim 25 wherein the shelf stable shredded cheese product resists oiling off and agglomeration at temperature of at least about 90° F. and further comprises a mixture of natural cheese and cheese for manufacture.

27. The product of claim 25 wherein said salt comprises sodium chloride, disodium phosphate, sodium hexametaphosphate, sodium alginate, titanium dioxide, and/or sorbic acid.

28. The product of claim 25 wherein said natural cheese is cheddar, colby, swiss, and/or low-moisture part-skim mozzarella, and the cheese for manufacture is reduced-fat cheddar, and/or skim milk curd.

29. The product of claim 25, further comprising about 2.7% to about 2.9% emulsifiers selecting from the group consisting of disodium phosphates, monosodium phosphates, and trisodium phosphates.

30. A method of manufacturing a shelf stable shredded cheese product that resists agglomeration when stored at 90° F. for two weeks, the method comprising:
combining a fat source, a protein source, a filler, NaC1 and at least one emulsifier salt, and water to form a cheese composition that is about 45 to about 50 wt. % moisture, about 15 to about 22 wt. % fat, about 19 to about 24 wt. % protein, about 3 to about 5 wt. % total salt, and has a pH between about 5.4 and about 6.0 to form a cheese composition; forming the cheese composition into cheese shreds, the fat source, protein source, filler, total salts and water in amounts and a ratio which is effective for providing cheese shreds which avoids oiling off and resist agglomeration when stored at 80° F. or for two weeks and/or under temperature abuse of about 80-100° F. when the cheese shreds have a size and shape capable of maintaining physical integrity and resisting agglomeration when stored at such time and temperature.

31. The method of claim 30 wherein the at least one emulsifier salt includes a chemical group selected from the group consisting of phosphate, citrate, and mixtures thereof.

32. The method of claim 30 wherein the cheese composition comprises from about 0.8 to about 2.1 weight percent of the composition.

33. A method of manufacturing a shelf stable shredded cheese product that resists agglomeration when stored at 90° F. for two weeks, the method comprising:
combining a fat source, a protein source, a filler, NaC1 and at least one emulsifier salt selected from the group consisting of orthophosphate, sodium hexametaphosphate, sodium acid pyrophosphate, trisodium citrate and mixtures thereof, and water to form a cheese composition that is about 45 to about 50 wt. % moisture, about 15 to about 22 wt. % fat, about 19 to about 24 wt. % protein, about 3 to about 5 wt. % total salt, has a pH between about 5.4 and about 6.0 to form a cheese composition; forming the cheese composition into cheese shreds, the fat source, protein source, filler, total salts and water in amounts and a ratio which is effective for providing cheese shreds which resist agglomeration when stored at 90° F. for two weeks and/or under temperature abuse of about 80-100° F. when the cheese shreds have a size and shape capable of maintaining physical integrity ,avoids oiling off, and resisting agglomeration when stored at such time and temperature.

34. The method of claim 33 wherein the cheese composition comprises from about 0.8 to about 2.1 weight percent of the composition.

* * * * *

UNITED STATES PATENT AND TRADEMARK OFFICE
CERTIFICATE OF CORRECTION

| | |
|---|---|
| PATENT NO. | : 8,017,169 B2 |
| APPLICATION NO. | : 11/323098 |
| DATED | : September 13, 2011 |
| INVENTOR(S) | : Gary William Trecker and Stephen S. Williams |

It is certified that error appears in the above-identified patent and that said Letters Patent is hereby corrected as shown below:

Column 2, line 8, in the Abstract, delete "hexametophosphate," and insert --hexametaphosphate,-- therefor Column 9, line 60, in claim 13, after "agglomeration" insert --and oiling off--

Column 10, line 33, in claim 21, after "90° F." delete "g419-1a"

Column 11, line 21, in claim 30, delete "NaC1" and insert --NaCl--

Column 11, line 31, in claim 30, after "80° F." delete "or"

Column 12, line 12, in claim 33, delete "NaC1" and insert --NaCl-- therefor

Signed and Sealed this

Thirteenth Day of December, 2011

David J. Kappos
*Director of the United States Patent and Trademark Office*